United States Patent
Di Cesare

(10) Patent No.: US 7,462,104 B2
(45) Date of Patent: *Dec. 9, 2008

(54) METHOD OF CONDUCTING AN INTERACTIVE COMPETITION

(75) Inventor: Christopher Di Cesare, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 178 days.

This patent is subject to a terminal disclaimer.

(21) Appl. No.: 10/917,498

(22) Filed: Aug. 13, 2004

(65) Prior Publication Data

US 2005/0020336 A1 Jan. 27, 2005

Related U.S. Application Data

(63) Continuation of application No. 10/121,707, filed on Apr. 15, 2002, now Pat. No. 6,800,031.

(51) Int. Cl.
*G06F 17/00* (2006.01)
*G06F 19/00* (2006.01)

(52) U.S. Cl. .............................. 463/40; 463/9; 463/42; 273/430

(58) Field of Classification Search .................. 463/9, 463/40–42; 273/429–432
See application file for complete search history.

(56) References Cited

U.S. PATENT DOCUMENTS

| 4,593,904 A | 6/1986 | Graves |
| 5,014,125 A * | 5/1991 | Pocock et al. ................. 725/93 |
| 5,899,456 A | 5/1999 | Weinstock et al. |
| 5,954,581 A * | 9/1999 | Ohta et al. ..................... 463/9 |
| 6,174,237 B1 | 1/2001 | Stephenson |
| 6,183,366 B1 | 2/2001 | Goldberg et al. |
| 6,267,379 B1 * | 7/2001 | Forrest et al. ............... 273/431 |
| 6,497,412 B1 | 12/2002 | Bramm |
| 6,881,146 B2 * | 4/2005 | Anderson et al. ............. 463/16 |
| 2002/0010584 A1 | 1/2002 | Schultz et al. |
| 2002/0133562 A1 * | 9/2002 | Newnam et al. ............ 709/216 |

OTHER PUBLICATIONS

"The Unofficial TattleTales Site". [online]. Jun. 21, 2001. [retreived on Feb. 15, 2005]. Retreived from the Internet <URL:http://www.bertconvy.net/taleshistory.html>.*

(Continued)

*Primary Examiner*—Robert E Pezzuto
*Assistant Examiner*—Frank M Leiva
(74) *Attorney, Agent, or Firm*—Birch, Stewart, Kolasch & Birch, LLP

(57) ABSTRACT

An interaction competition provides an entertaining enjoyable environment for a player to compete against a celebrity in a head-to-head trivia game. The questions may be associated with the celebrity rather than random general information or general trivia. The celebrity can participate via stored audio media, stored audio-visual media, or in a live real-time format. A goal of the competition is for a player to gain more points than the celebrity. Another goal of the competition is for the player to answer more questions correctly than the celebrity. At least one or more game episodes can be provided on computer-readable media. A game episode may be implemented with a product featuring a celebrity. The competition can be provided in many different gaming environments. The competition can be provided online via a web-based format; a television game show format; telephone call-in radio talk show format; or a cellular phone game format.

26 Claims, 10 Drawing Sheets

OTHER PUBLICATIONS

"Tattletales". [online]. Feb. 26, 2002. [retrieved on Feb. 15, 2005]. Retrieved from the Internet <URL:http://www.curtalliaume.com/tattleta.html>.*

David Schwartz et al. The Encyclopedia of TV Game Shows Third Edition. Checkmark Books New York: 1999, p. 217-218.*

"The Unofficial TattleTales Site". [online]. Jun. 21, 2001. [retrieved on Feb. 15, 2005]. Retrieved from the Internet <URL:http://www.bertconvy.net/taleshistory.html>.*

"The Game Show Home Game Home Page" [online]. [retrieved on Jul. 12, 2005]. Retrieved from the Internet <URL:http://userdata.acd.net/ottinger/elec/>.*

"Match Game '75/Match Game P.M." [online]. Mar. 17, 2001. [retrieved on Mar. 1, 2005]. Retrieved from the Internet <URL:http://www.curtalliaume.com/mg.html>.*

"The Unofficial TattleTales Site". [online]. Jun. 21, 2001. [retrieved on Feb. 15, 2005]. Retrieved from the Internet☐☐<URL:http://www,bertconvy, net/taleshistory, html>.*

"Tattletales". [online]. Feb. 26, 2002. [retrieved on Feb. 15, 2005]. Retrieved from the Internet☐☐<URL: http://www,curtalliaume, com/tattleta.html>.*

WMS Gaming Website. "Match Game Video Slot, How to Play" ☐Http//www.wms.com/gamedetailinfo.php?Themeld=331. Rextracted by Fank Leiva on Dec. 15, 2006.*

"Match Game '75/Match Game P.M." [online]. Mar. 17, 2001. [retrieved on Mar. 1, 2005]. Retrieved from the Internet☐☐<URL:http:IIwww.curtalliaume.comlmg.html>.*

The Hollywood Squares (1975: King World Production): Alliaunme, Curt, Nov. 21, 2002,<http//:www.curtalliaume.com/squares.html>, 8 pages.*

"Win Ben Stein's Money" A Salute to Game Shows, Jul. 28, 1997. [online]. [retrieved on Oct. 22, 2003]. Retrieved from the Internet: <URL:http://www.shaunsplace.com/millionaire/special_edition_winner.htm>.

"A Tribute to Who Wants to be a Millionaire" Special Edition Winners. May 2001 [online]. [retrieved on Oct. 22, 2003]. Retrieved from the Internet:<URL:http://www.shaunsplace.com/millionaire/special_edition_winner.htm>.

"The Weakest Link—Episode List" [online]. [retrieved on Feb. 19, 2004]. Retrieved from the Internet:: <URL:http://www.tvtome.com./tvtoma/servlet/EpisodeGuideServlet/showid-2169/>.

"Who Wants to Be a Millionaire-Episode List" [online]. [retrieved on Feb. 19, 2004]. Retrieved from the Internet: <URL:http://www.tvtome.com/tvtome/servlet/EpisodeGuideServlet/showid-823/.

Kevin on Celebrity Millionaire [online]. [retrieved on Feb. 19, 2004]. Retrieved from the Internet: <URL:http://schuleer.homestead.com/Millionaire~ns4.html>.

"Celebrity Millionaire" [online]. May 7, 2000. [Retrieved on Feb. 19, 2004]. Retrieved from the Internet: <URL:http://www.funtrivia.com/quizdetails.cfm?id=4339.

* cited by examiner

METHOD OF CONDUCTING AN INTERACTIVE COMPETITION

CROSS REFERENCE TO RELATED APPLICATION

This application is a continuation of U.S. application Ser. No. 10/121,707 filed Apr. 15, 2002, now U.S. Pat. No. 6,800,031 issued Oct. 5, 2004, in which the contents of said application is hereby incorporated herein by reference.

FIELD OF THE INVENTION

Aspects of the present invention are directed generally to an apparatus and method for conducting a competition. More particularly, aspects of the present invention relates to an interactive competition wherein a player competes against a celebrity.

BACKGROUND OF THE INVENTION

Consumers in the modern culture have a general fascination with public figures or celebrities. Celebrity can be related to professional and amateur sports, entertainment, business, media, or politics to name a few areas. In this modern culture, celebrity gossip and news programs are promoted to the public in print media, radio media, television media and on-line media. In the past years, game shows have been produced for television programs in which a celebrity plays for a charity or some other organization. In many television game shows, the celebrity is asked to answer garden-variety trivia related to general subject matter. While providing an entertainment outlet for a fan to watch the celebrity play such a game show, the fan has no interaction with the celebrity. Eventually, the fan may lose interest in the show by just merely watching a static game show with no interaction.

Numerous consumers use the computer networks, for many purposes including to purchase products online, locate special events, read news stories, pay bills and play games. Online gaming is also provided over computer networks, such as the World Wide Web. Gaming web sites provide players with numerous types of computer games. In the online environment, entertainment web sites that focus and celebrity news and gossip are popular in terms of use. Some of these web sites are have subjects about celebrities, shows, or movies. In these sites and others, a devotee of the subject might be invited to take a quiz about that subject. While these sites might test the devotee's knowledge, the quizzes do not provide the experience of playing against a celebrity about the questions. Moreover, the sites with such quizzes, do not provide interactive gaming against the celebrity either in-person or in a virtual environment.

SUMMARY OF THE INVENTION

The present invention provides an entertaining an interactive competition wherein a player competes against a celebrity.

Aspects of the invention provide a method and a system of conducting a competition in which a player can compete against a celebrity in a head-to-head trivia game. In one aspect, the subject matter of quiz questions is associated with the celebrity rather than unrelated sources or general trivia. In another aspect, a player competes against a celebrity in a number of question formats including a multiple-choice quiz question environment. In another aspects, the celebrity may participate against the player via prerecorded media to form an asymmetrical competition. In one aspect, the celebrity may participate against the player in a real-time format. In yet another aspect, the competition provides an entertaining enjoyable environment for a player to compete against a celebrity. In another aspect, an aim of the competition includes the player to outscore or outperform an opponent, such as the celebrity, by obtaining more points at the end of the competition. Another aim of the competition is for the player to answer more questions correctly than a celebrity thereby to win a prize. In these aspects, a player can have a fun experience of playing against a celebrity in an interactive gaming environment.

In other aspects of the invention, the competition can be provided in many different environments, for example, including but not limited to a computing environment including an online environment, a web-based environment, or general computing environment; a television environment in a game show format; a radio environment in a radio talk show format; or a wireless communications environment in a cellular phone game format.

In other aspects of the invention a computer readable medium includes a game host component that presents pre-recorded media data which has quiz questions with trivia information associated with a celebrity. A celebrity component provides preselected answers to the quiz questions. A user interface receives a player an answer to the quiz questions answered by the celebrity component. The scores of a player and the celebrity component are tracked and updated based on the answers to the quiz questions.

The above and other aspects, features and advantages of the present invention will be readily apparent and fully understood from the following detailed description of preferred embodiments, taken in connection with the appended drawings.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Figure 1:
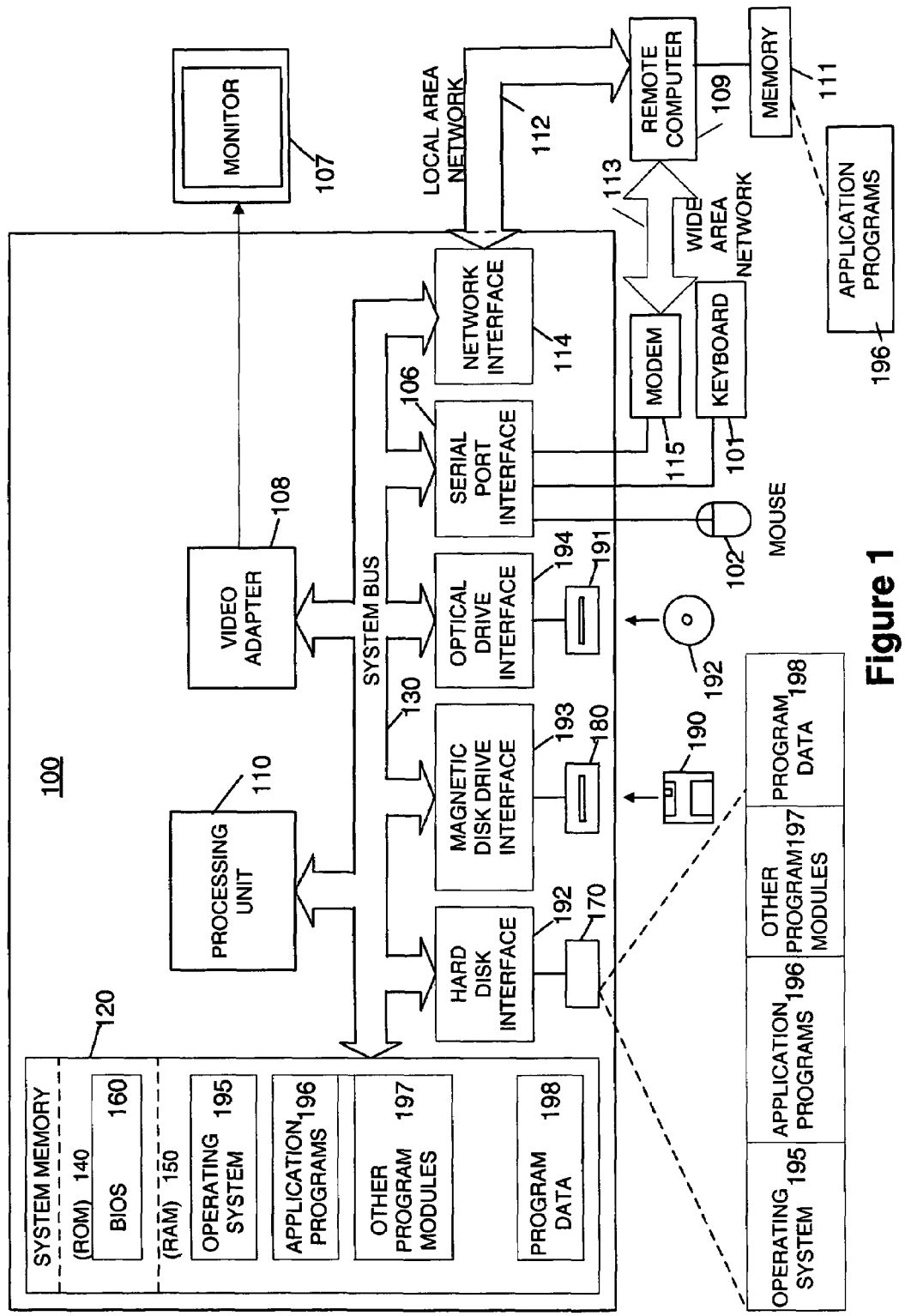
FIG. 1 is a schematic diagram of a general-purpose digital computing environment that can be used to implement various aspects of the invention.

The following description is divided into sub-sections to assist the reader. The sub-sections include: Terms; Overview; General Purpose Computer; Gaming System; Game Flow; Representative Display Environment; Selecting a Celebrity; Preprocessing for a Game Episode; Cellular Phone Environment; Real-Time Game Show Environment, and a Summarization of the Interactive Competition.

Terms

As used herein, the term "celebrity" is defined as a person that has come into the community attention by way of notoriety or general fame of previous activities. A "celebrity" can be associated with industries including but not limited to professional and amateur sports, entertainment, music, motion picture, business, print and electronic media, politics, and the like.

As used herein, the phrase "directly associated" when used in reference to a celebrity, is defined as a topic area which is related to the achievements, work, life, possessions, or career of the celebrity. For example, a "directly associated' question to a musical celebrity may be a question about one their songs a being best seller, such as "what month did your latest album reach the Billboard 200?" In another example, a 'directly associated" question to an actor may be, "how many acting awards have they won?"

As used herein, the phrase "indirectly associated" when used in reference to a celebrity, is defined as a topic area having a related link to another topic that is directly associated with the celebrity. For example, an "indirectly associated" question to a musical celebrity may be a question about other musical artists in the celebrity's musical category. For example, a country singer, such as Garth Brooks, may be "which other singer's album did Garth's latest album beat for the number one position of the most played album?"

As used herein, the phrase "associated with" when used in reference to a celebrity, includes topics that are "directly associated" or "indirectly associated" to the celebrity.

As used herein, a "linking discussion" when used in reference to a celebrity, is defined as a discussion that relates the celebrity to an associated question. For example, a linking discussion regarding about the latest album title and a release date of Garth Brooks can be for the indirectly associated question "which other singer's album did Garth's latest album beat for the number one position of the most played album?"

Overview

As an overview in FIGS. 1-10, aspects of the present invention provide an entertaining enjoyable environment in which a player competes against a celebrity in a head-to-head trivia game. In one aspect, the subject matter of the quiz questions is associated with the celebrity. In certain aspects, the celebrity can participate via prerecorded audio media, prerecorded audio-visual media, or in a live real-time format. A goal of the competition is for a player to gain more points than the celebrity. This can be accomplished by providing a scoring algorithm to keep a running total between the celebrity and player of points awarded based on selecting a correct answer. Another goal of the competition is for the player to answer more questions correctly than the celebrity. In both goals, the player can win to prize or a designation of as a "true fan" of the celebrity.

General Purpose Computer

FIG. 1 illustrates a schematic diagram of an exemplary conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102, such as a mouse or stylus. Other input devices (not shown) may include a microphone, joystick, trackball, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 1 environment shows an exemplary conventional general-purpose digital environment, it will be understood that other computing environments may also be used. For example, one or more embodiments of the present invention may use an environment having fewer than all of the various aspects shown in FIG. 1 and described above, and these aspects may appear in various combinations and sub-combinations that will be apparent to one of ordinary skill.

Gaming System

Figure 2:
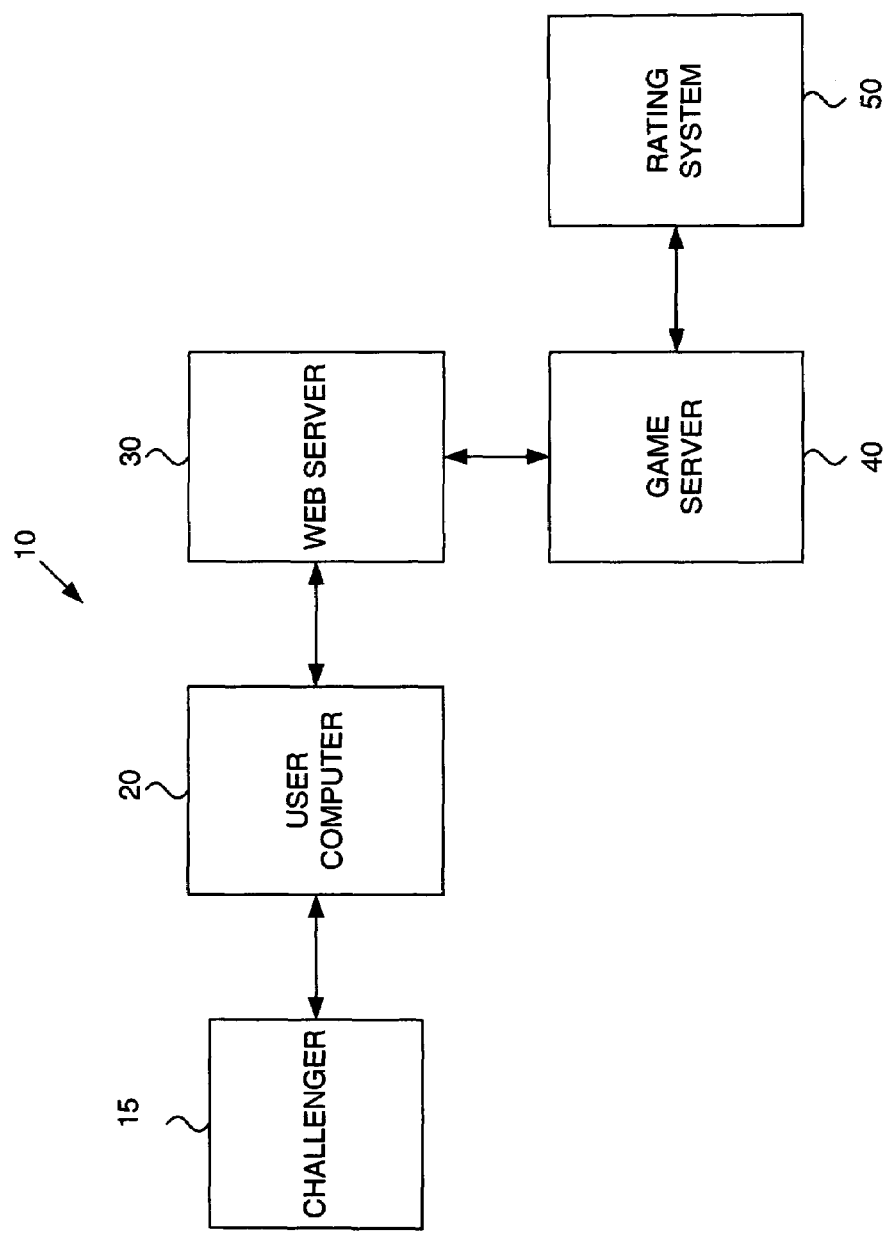
FIG. 2 is a schematic diagram of a system that can be used to implement various aspects of the invention.

FIG. 2 schematically illustrates one arrangement of a gaming system 10 for providing a competition that can be implemented in accordance with various aspects of the present invention. In one aspect, the competition may be conducted in an online environment, such as a web-based game. In FIG. 2, a challenger 15 has a user computer 20 with Internet access that is operatively coupled to the web server 30. User computer 20 and web server 30 implement various aspects of the computer 100 shown in FIG. 1 which will be apparent in the detailed description. For example, user computer 20 may be in the form of a personal computer, a tablet personal computer or a personal digital assistant (PDA). Tablet PCs interprets marks made using a stylus in order to manipulate data, enter text, and execute conventional computer application tasks such as spreadsheets, word processing programs, and the like.

User computer 20 is configured with an application program that communicates with web server 30. This application program can include a conventional browser or browser-like programs. In one arrangement, the competition is presented and managed by web server 30 for presentation to the challenger 15 on user computer 20. In an aspect of the invention, challenger 15 with user computer 20 plays an interactive question/answer competition against a celebrity. In one aspect, the subject matter of the questions/answers is associated with the celebrity during the competition. Advantageously, a goal of the competition is that a challenger can demonstrate their knowledge about of the celebrity. This can be accomplished by showing that the challenger 15 knows more than the celebrity about the particular subjects associated with the celebrity.

Referring to FIG. 2, web server 30 communicates with a game server 40. Game server 40 may implement various aspects of computer 100 shown in FIG. 1. Game server 40 may include an application program for presenting and conducting the competition. In one arrangement, the application program may include a FLASHPLAYER® by Macromedia, Inc. Nevertheless, other application programs may be used for the competition, such as JAVA™. In one arrangement, game server 40 may include at least one or more program modules that provide a plurality of audio files embodying sound clips of the voice of a celebrity. In an alternative arrangement, game server 40 may also include at least one or more program modules which provide a plurality of multimedia files of the celebrity so that a challenger 15 can see and hear the celebrity on user computer 20. The audio files and multimedia files are encoded in computer readable format on a computer usable storage medium, such as a floppy drive, optical disk, magnetic hardware drive, programmable memory, or any other device that stores digital data for processing as shown in FIG. 1. This facilitates the data to be transmitted via network streaming or other network protocol to the user computer 20. The audio files and multimedia files can be embodied in any appropriate digital encoded format for using in computing environments.

Gaming Flow

Figure 3:
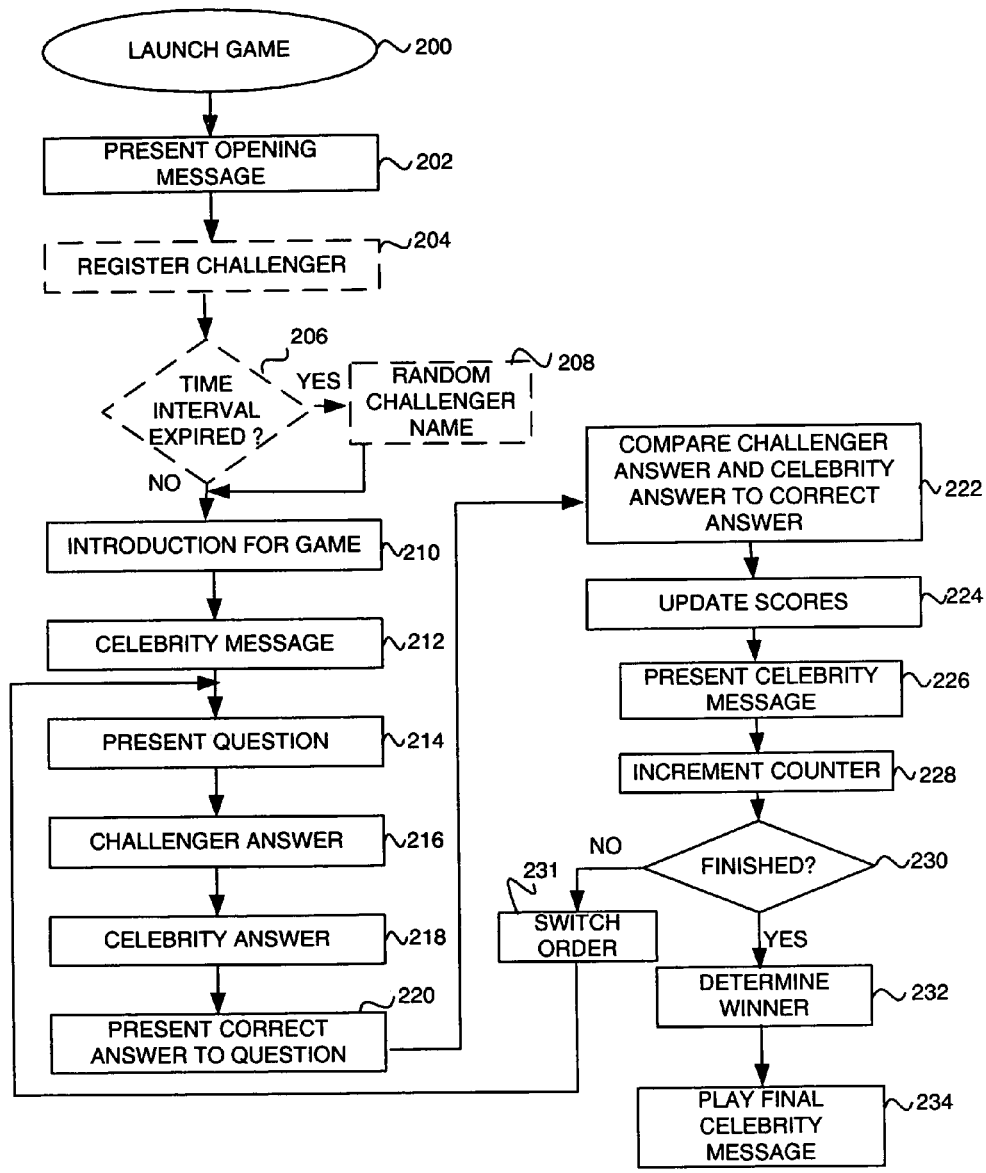
FIG. 3 is a flow diagram of an interactive competition in accordance with the present invention.

FIG. 3 illustrates a process for conducting a competition with aspects of the present invention. It is to be understood that a game episode shown in reference to FIG. 3 can be presented in alternative formats including (a) an audio format; (b) a video format; or (c) a combination of both an audio format and a video format. For example, the audio format may be used for a call-in radio show, or an interactive voice response system over a telephony connection. The video format may be used for devices that have a visual display without audio or to enable a user to temporarily disconnect audio. These features also enable a deaf individual to experience the competition visually. The combined audio and video provides an enhanced gaming experience for the challenger in an electronic gaming environment.

While a computer-based competition is described, it should be appreciated that the challenger component and the celebrity component of the competition can be implemented in a live TV game show format as well. This arrangement is further described in the section entitled "Real-Time Game Show Environment". In one arrangement, an celebrity component on the competition may be a virtual format created by a game episode including prerecorded audio of the voice of the celebrity with or without multimedia images as provided by game server 40 as shown in FIG. 2. This virtual format forms an asymmetrical feature of the competition between the celebrity and the challenger. The challenger plays in real-time and the celebrity plays in non-real-time. The challenger responds to the same questions previously answered by the celebrity and the challenger receives real-time feedback about the celebrity answers and the challenger answers. This facilitates a virtual immersive environment for the interactive competition.

In a web-based competition, the description is generally based on a competition in which a challenger may access a web site. Referring to FIG. 3, in step 200, the game episode is launched by challenger 15 with user computer 20 (as shown in FIG. 2). Accordingly, the game episode is presented on a web page in which the challenger simply "clicks" on an icon or web-link to launch the desired game episode. Generally, web server 30 transmits the game episode to the user computer 20. A presentation environment on the user computer 20 is opened so that the game episode can be viewed and interacted on the user computer 20. In step 202, once the game episode is loaded, an opening game segment is presented both audibly and visually to the challenger 15. In this step, the challenger 15 is introduced to the game episode and provided with general information on the goal of the competition and information about the guest celebrity on topics directly associated with the celebrity.

Optionally, in step 204, a challenger may register in the particular game episode. In one aspect of the process, the challenger 15 may enter a desirable user name within a predetermined time interval. The user name is implemented to associate the challenger scores and interactive questions against the celebrity in the game episode. The time interval is provided so that the game episode can proceed, if a user name is not provided such would be the case, for example, if the challenger 15 chooses not to provide his or hers name. Accordingly, in step 206, if the time interval has expired, then the game episode proceeds to step 208. In step 208, a randomly selected user name is assigned to the challenger. However, if a user name is provided before the expiration of the time interval, the game flow proceeds to step 210 with the specifically entered user name. In one aspect of the process, in step 210, an opening introduction is presented to the challenger. This feature facilitates a virtual immersive gaming environment for the challenger.

In continuing the game flow, in step 212, a celebrity introduction is provided to the challenger. The celebrity introduction further provides a virtual immersive game environment. In one arrangement of the celebrity introduction, a game host component interviews the celebrity about the projects of celebrity in a simulated format of a talk show type presentation. Alternatively, the celebrity introduction can be used for promotion of the celebrity. For example, a movie segment of the celebrity may be streamed to the user computer 20 automatically or upon selection of the challenger 15. This feature is more fully described with reference to FIG. 6. During the introduction, the game host provides a lead into the next phrase of the competition—the question/answer portion. It should be understood that the game host could be a human when the competition is provided a live game show format.

In one aspect, the game host audibly provides a linking discussion for a question associated with the celebrity. The linking discussion facilitates the introduction of the question to the challenger and the celebrity so they know the subject area of the question. Accordingly, in step 214, game server 40 provides to the challenger 15, a quiz question having subject matter associated with the celebrity. In one aspect, the question may be indirectly associated with the celebrity to provide a measure of spirited competition so that the challenger has higher probability of answering the question correctly than the celebrity. According to an aspect, a quiz question can have many different arrangements or format types for a game episode. In one arrangement, a quiz question may have a multiplicity of answer-choices; for example, four answer-choices may be presented to the challenger 15. At least one of the answer-choices is correct and at least one of the other answer choices is incorrect for the quiz question. In an alternative arrangement, several answer-choices may be correct for the question, such as two or three out of four answer choices may be correct. In yet another arrangement, the answer choices may be in a true-false or a yes/no format. Alternatively, the challenger may enter the answer without having answer choices presented to them. In this manner, these alternative arrangements provide a challenger with a variety of question types to enhance the gaming experience. Nevertheless, the quiz question and the answer-choices may be presented in audio form in which the game host states the quiz question and the answer-choices. Likewise, a visual representation of the quiz question and answer-choices can be displayed to the challenger in the competition environment.

The game flow may to proceed to step 216, whereby the challenger 15 may provide an answer to the quiz question using a variety of input techniques. In one arrangement, the challenger may click on a user-selectable icon or HTML-link to select a desired answer. Accordingly, game server 40 may receive the challenger's selection via the web server 30. In other arrangements, the challenger 15 may use input devices shown in FIG. 1 as such a keyboard 101 and pointing device 102. Other input devices (not shown) may include a microphone, joystick, trackball, game pad, digitizing tablet, stylus, and the like.

Continuing in the game flow, in step 218, a preselected answer by the celebrity is presented to the challenger. The preselected answer can be presented to the challenger audibly, visually, or in both ways. During the presentation of the preselected answer, simulated background sounds can be generated to enhance the virtual immersive environment of the competition. For instances, the background sounds may include simulated audience applause, clapping, cheering, booing etc. These types of sounds are typically of live audience events, such as TV talk shows or TV game shows. The simulated background sounds may be provided at this stage in the game flow or at any other stage in the game flow. In a further aspect, prerecorded data of the celebrity can be played with or without simulated background sounds. In another aspect, the game host may provide some jovial commentary during the presentation of the preselected answer. By way of example, if the challenger answer and the celebrity answer are the same answer-choice for the quiz question, the game host may provide a statement, such as "challenger is going with the celebrity on this one" or "sticking with the celebrity of this question," etc. These features further provide a virtual immersive environment for the challenger to provide the physiological feeling as if he or she is competing on a game show.

In step 220, the correct answer among the possible answers for the quiz question is presented to the challenger. In accordance with an aspect of the invention, the correct answer-choice can be presented audibly by the game host or visually, or in both ways. Next the game flow proceeds to step 222, whereby the challenger's answer and celebrity's preselected answer are compared to the correct answer of the question. In this comparison step, the game host provides audible commentary to make the environment feel more realistic to the challenger.

In step 224, scores are updated for the challenger and the celebrity based on the respective answers to the question. In one arrangement, a scoring algorithm maintains a running total of the scores obtained by the challenger and the celebrity during a game episode. For instances, scores can be assigned by correctly answering the quiz question such that a selection of the correct answer causes the scoring algorithm to update the score for the challenger and the celebrity, respectively. In one case, each quiz question may have equal points to be the awarded to the challenger and the celebrity. For example, the challenger and the celebrity may each earn one-hundred points for each correct answer-choice. In one aspect, if the challenger answered a quiz question correctly while the celebrity answered incorrectly, the challenger can earn one-hundred points for that correct answer-choice and an additional one-hundred point bonus (i.e. two-hundred points). Alternatively, the score may be a related to a level of difficulty for a quiz question. In yet another aspect, points can be weighted in accordance with the level of difficulty of each question.

Optionally, the challenger's answer should be entered within a predetermined time interval, if an answer is not provided, the game episode proceeds to the next quiz question. This causes the challenger to not receive an opportunity to increase their score. Nevertheless, it should be appreciated that the challenger score is generally not decremented due to the elapsed time to make an answer to the question.

In step 226, a celebrity message may be audibly or visually provided to the challenger. This message may contain subject matter based on the outcome of the selected answers. In one aspect, the outcome of a question has at least four states—(a) the celebrity can win; (b) the challenger can win; (c) the celebrity and the challenger can both answer incorrectly; and (d) the celebrity and the challenger can both answer correctly. For instances, if the celebrity "won" the quiz question, meaning the celebrity answered correctly and the challenger answer incorrectly, the celebrity message may include a bantering phrase intended for good humor towards the challenger about getting the quiz question wrong. Such bantering phrases may include "better luck next time," "watch and learn," or "you need to be your toes, next time." Alternatively, if the challenger "won" the quiz question, i.e. the challenger answered the correctly and the celebrity answered incorrectly, the celebrity message may includes a congratulatory phrase, such as "good answer," "you know your trivia," "you know me better than I know myself," etc. In yet another alternative, if the celebrity and the challenger both answered the incorrectly, the celebrity message may have a consoling phrase for the challenger, such as "sorry, about that answer," etc. In another alternative, if the both the celebrity and the challenger answered correctly, the celebrity message may have a phrase, such as "stick with me," or "we both got the question right," etc. There are many variations of the types of celebrity messages based on teachings of the present invention. These features further provide a fun interactive gameplay for the challenger.

In step 228, a counter may be incremented once during a question answer cycle. In step 230, the counter can be used to indicate another question-answer cycle for the game episode. Accordingly, the game episode may proceed with another quiz question having other possible answer-choices. The game flow proceeds to step 231, whereby the order of steps 216 and 218 are switched so that challenger 15 and the celebrity can alternate on who answers the next quiz question first. This alternating feature facilitates an immersive environment by providing a feeling of a spirited competition. If the celebrity was to answer all the questions before the challenger, they could always select the same answer of the celebrity. Continuing the game flow, steps 214-230 are repeated for a question-answer cycle.

In one arrangement, a predetermined number of quiz questions, such as three to seven different quiz questions associated with the celebrity, might be sequentially played during a game episode. It should be understood that more than seven questions may be played during a game episode. In one aspect of the invention, the quiz questions for the game episode can be randomly selected from a larger set of quiz questions associated with the celebrity. For example, for each game episode, four to seven questions may be randomly selected from a set of one-hundred questions. In this way, each game episode for a particular celebrity may have a different configuration of quiz question subject matter and/or different types of quiz question formats. Further, the aspect can improve the gaming excitement of playing against the celebrity because each game episode is new to the challenger.

After the predetermined numbers questions have been presented, in step 232, a winner of the competition is determined based on the running total of the scores. The respective score values between the challenger and celebrity are compared. If the challenger score value is greater then the celebrity score value, then the challenger is deemed to have won the competition. If the challenger score value is lower than the celebrity score value, then the challenger has not won the competition. The challenger, however, has an added benefit of being educated more about the celebrity by completing the competition. Further, the challenger generally benefits from an enjoyable interaction of the competition with the celebrity.

In step 234, a final celebrity message is provided to the challenger. In this step, the celebrity message generally closes the competition based on the final score. The message may have comments about how they enjoyed the competition, etc. Further, the game host may provide other comments for the challenger.

In an alternative arrangement, the competition may proceed into one or more additional rounds. In at least one of the rounds, the challenger is given a predetermined time interval to answer a series of questions associated with the celebrity. Then the scores are updated for the challenger 15 and the celebrity on the basis of the number of questions answered correctly. In one aspect, the challenger 15 and the celebrity are sequentially presented with questions in the form of incomplete sentences. Two answer-choices are presented, one of which will correctly complete the incomplete sentence. The incomplete sentences and answer-choices have subject matter initially associated with the celebrity. The middle questions become indirectly associated with the celebrity. As the questions count down, the answers-choices eventually connect to another topic that is associated with the celebrity by the sequential linking of the question answers. Then score values are assigned for each correct answer-choice, such as one-hundred points are awarded to the challenger and celebrity, respectively. If the challenger finishes the questions before the time period expires, the challenger will earn bonus points. For example, for every second remaining on the time clock, the challenger may earn ten additional points. There is no penalty for allowing the clock to run out; therefore the challenger will keep the points he or she earned for selecting the correct answer-choices.

With reference to FIG. 2, in one aspect of the gaming process, when a round of the competition is completed, the challenger 15 may be given the option to report their score so as to determine how they rate against other players. The challenger is generally prompted to sign into a rating system 50 with a rating board. The rating system 50 may communicate with the game server 40. After the challenger has signed in, a confirmation that the score has been uploaded may be provided to the challenger 15.

In an alternative aspect, multiple challengers may play multiple game episodes at the same time in which the game episodes have the same celebrity. This aspect provides a multiplayer competition in which a group of challengers can test their knowledge against each other and the celebrity the game episode at the same time. A winner may be determined based on the number of point earned by outscoring the celebrity and the other challengers. In such a case, the rating system 50 may include a leaderboard that tracks scores during the rounds.

Representative Display Environments

Figure 4:
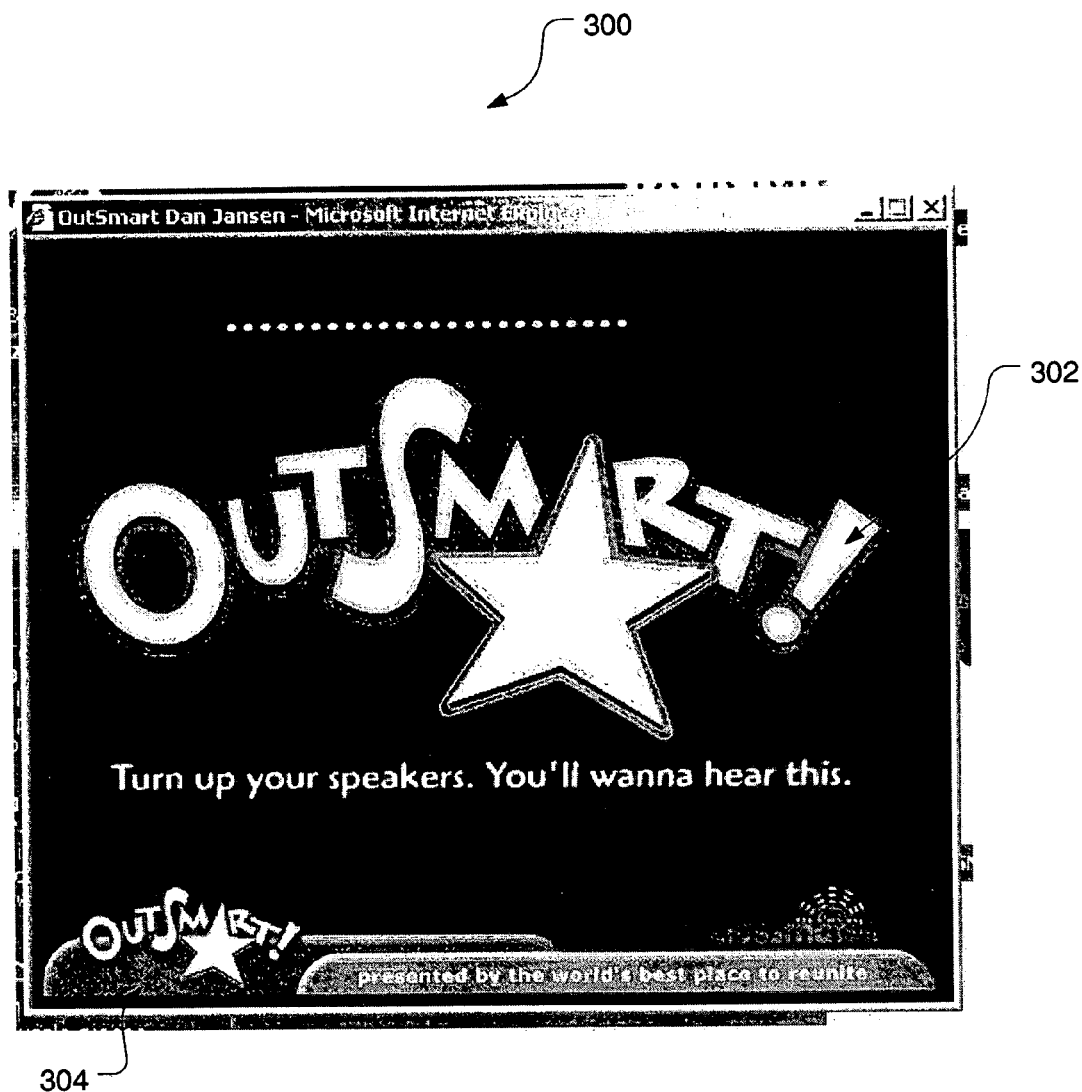
FIG. 4 is a schematic representation of an opening presentation environment.

FIGS. 4-9 illustrate various representative multimedia display environments that may be used in a computer-based competition as carried out with reference to FIG. 3. It is understood that a virtual immersive environment may be created with animations of graphical objects in the multimedia environments described herein. By way of example, FIG. 4 illustrates an opening presentation environment 300 of a web-based competition. The presentation environment 300 can have title region 302 of the web-based competition, such as a game called OUTSMART™. In one aspect, a non-game region 304 may be provided in the opening presentation environment 300. The non-game region 304 may be generally provided on the lower portion of the environment and can be used for desirable purposes. In one arrangement, non-game region 304 facilitates for sponsorship of the game episode and a way for business establishments to reach users of the competition. Alternatively, non-game region 304 may be used for promoting the celebrity and/or current projects of the celebrity. In one aspect, non-game region 304 may be a click-through type that links to a web page.

Figure 5:
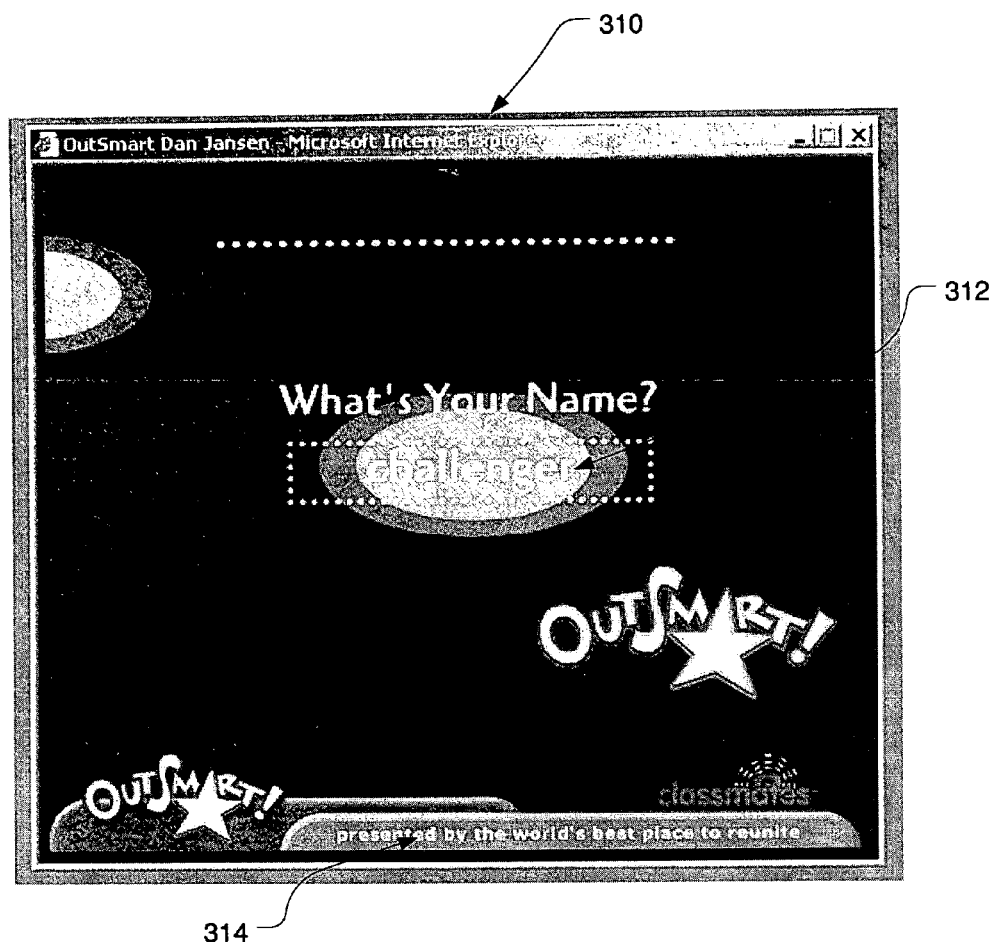
FIG. 5 is a schematic representation of registration display environment.

By way of example, in FIG. 5, a presentation environment 310 may request the challenger enter a name into user selectable box 312. For example, such a name may be entered with a desirable input device, such as a keyboard 101. Similarly as the opening presentation environment 300, a non-game region 314 may be generally provided on the lower portion of the environment 310.

Figure 6:
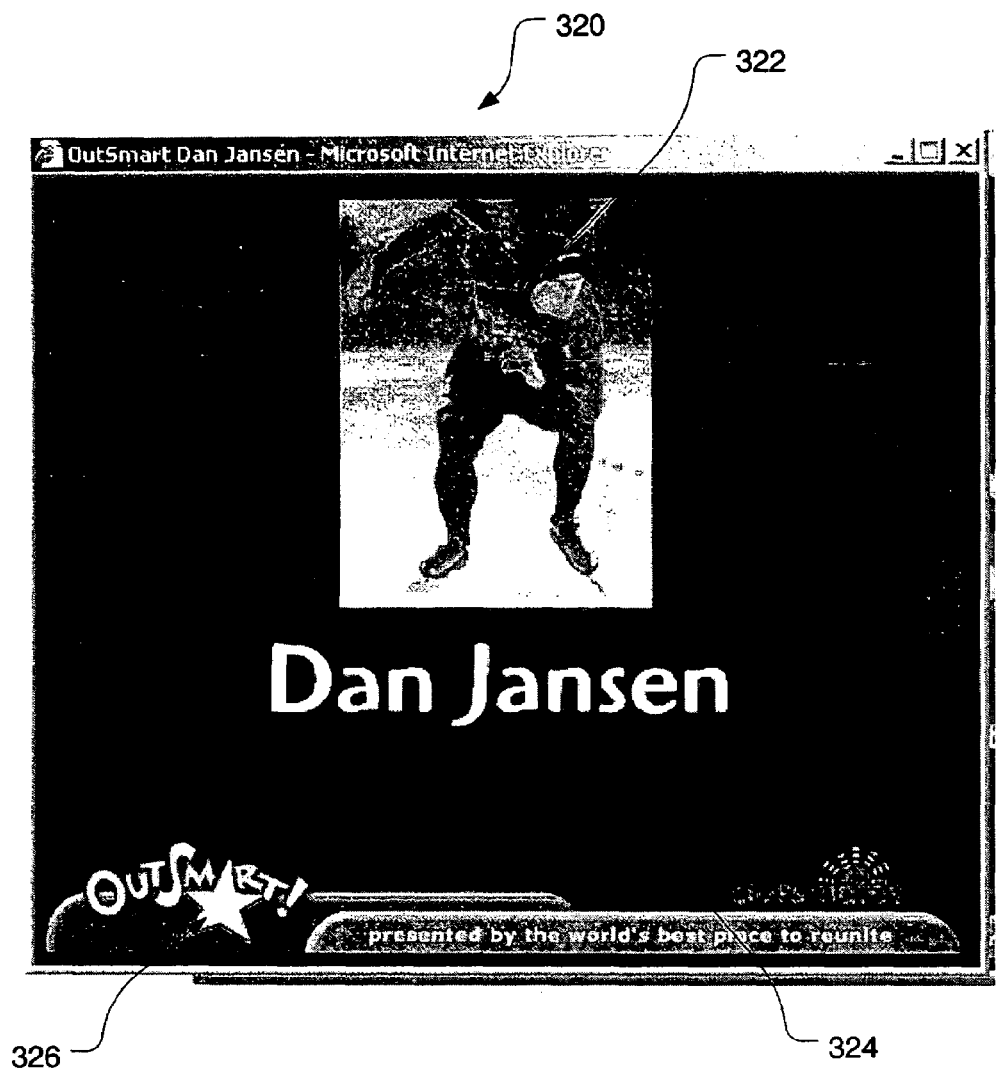
FIG. 6 is a schematic representation of a celebrity display environment.

By way of example, in FIG. 6, a presentation environment 320 for introducing a celebrity for a game episode may include an image region 322 for the celebrity. The image region 322 may include a digital image of the celebrity or a series of multimedia images may be the streamed and presented into region 322. For instances, the multimedia images could be a movie clip or motion picture segment featuring the celebrity. This aspect provides for an enhanced gaming experience for the challenger. In the example of FIG. 6, an Olympic speed skater and gold medal winner Dan Jansen is the celebrity. A name region 324 is also provided for displaying the name of the celebrity. Similarly as the opening presentation environment 300, non-game region 326 may also be provided in the environment 320 as well.

Figure 7:
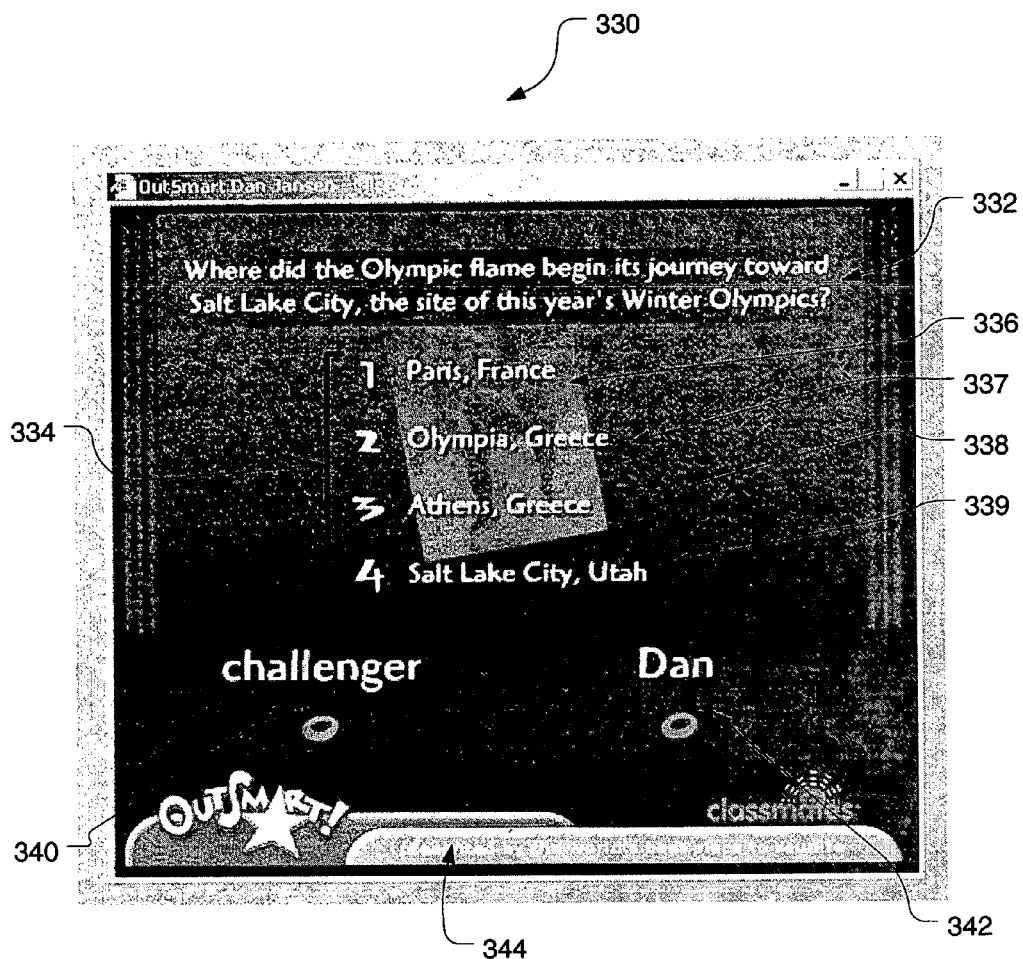
FIG. 7 is a schematic representation of a first competition display environment.

A question/answer environment 330 is schematically shown in FIG. 7. Purely by way of example without limitation of the invention, in FIG. 7, an upper portion of the question/answer environment 330 includes a question region 332 and answer region 334 having four possible answer-choices 336, 337, 338, 339 below the question region 332. Each answer-choice may have a user-selectable portion for the challenger to select thereon. The user-selectable portion also provides a feature for facilitating visually distinguishing between the selected answer of the challenger and that of the celebrity. This feature can be accomplished in a variety of ways including, using different fonts styles or varying the fonts styles; changing the background and foreground color and/or contrast of the answer-choices; and encircling the answer-choices based on the selections. In an alternative arrangement, a graphical representation may be used to indicate each selection. For example, a circle may appear around the number of the answer-choice of the challenger. Likewise, a star may appear over the answer-choice of the celebrity. Nevertheless, in the question/answer environment 330, the lower region is divided into a challenger region 340 and a celebrity region 342 whereby the scores values are displayed and tracked for the challenger and the celebrity during the competition. In a further aspect, a non-game region 344 can be provided in the lower region as well.

In the example shown in FIG. 7, the celebrity is Dan Jansen, and the question region 332 includes a quiz question such as "Where did the Olympic flame begin its journey toward Salt Lake City, the site of this year's Winter Olympics?" The answer region 334 includes answer-choices—"1 Paris, France;" "2 Olympia, Greece;" "3 Athens, Greece;" and "4 Salt Lake City, Utah." In this case, the example question is indirectly associated with Dan Jansen, because the topic of the question concerns a topic having a related link to another topic that is directly associated with the Dan Jansen. Namely, the topic area of the example question concerns the Winter Olympics in the Year 2002. The related link of the example question is broadly the "Winter Olympics". The topic that is directly associated with Dan Jansen is that he won an Olympic Gold medal in the men's 1000-meter speed skating event in the Winter Olympics of the Year 1994.

Figure 8:
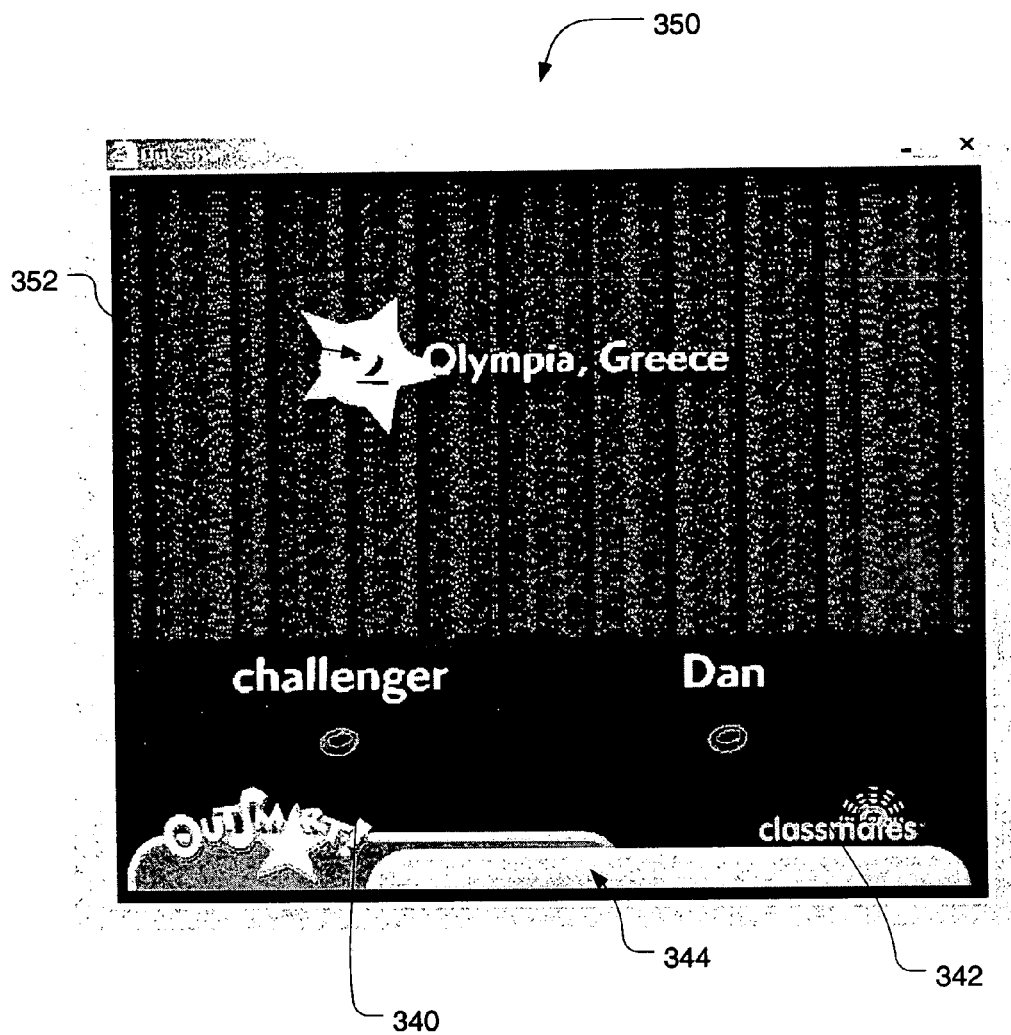
FIG. 8 is a schematic representation of a second competition display environment.

By way of example, in FIG. 8, answer environment 350 has a correct answer region 352, a challenger region 340 and a celebrity region 342. If desired, a non-game region 344 may be displayed as well. In the example concerning Dan Jansen, the correct answer region 352 includes the answer to the quiz question shown in FIG. 7. The answer is "Olympia, Greece." It should be recognized that for the correct answer, the challenger 15 can visually distinguish whether they answered the question correctly and whether the celebrity did also. In this example, both the challenger and Dan Jansen answered correctly. Accordingly, the correct answer region 352 displays a graphical circle for the challenger and a superimposed graphical star for Dan Jansen's answer. Nevertheless, other variations of visually distinguishing the correct answer are possible using the teachings of the present invention.

Figure 9:
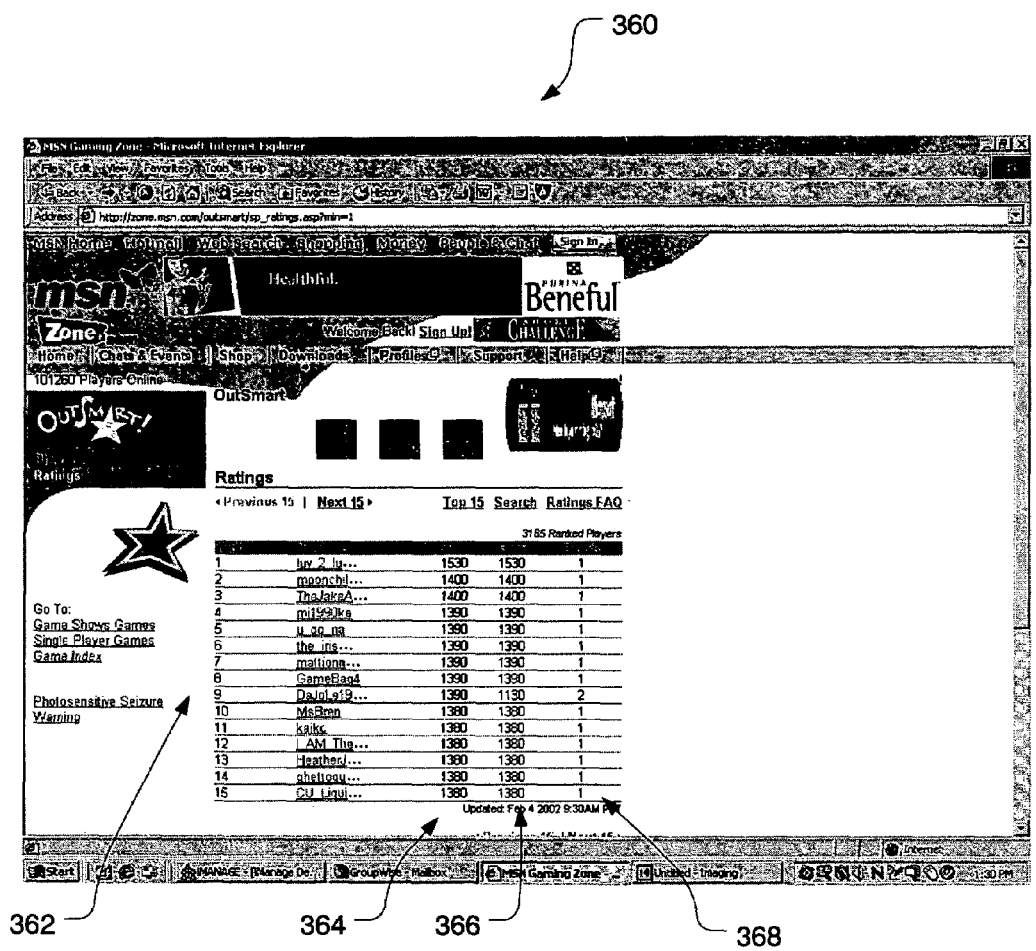
FIG. 9 is a schematic representation of a rating display environment.

FIG. 9 is a schematic representation of a rating environment that may be implemented for the present invention. A rating presentation environment 360 may have a listing region 362 of previous players of a game episode or several game episodes. The players are ranked as the player with the highest score is ranked first, then lower scores of other player are ranked accordingly. The environment 360 may have a best score portion 364, and average score portion 366, and region 368 for the numbers times the player has been in the competition.

It should be appreciated that aspects of a game episode shown in FIG. 3 and multimedia display environments shown in FIGS. 4-9 may be implemented on a variety of electronic gaming environments. Such electronic gaming environments include but are not limited to a personal computer 100; an electronic gaming console (not shown); a web-based system, or online system shown in FIG. 2. It will be appreciated by those skilled in the art that other types of electronic gaming environments could be used to implement aspects of the present invention.

In further aspects, computer-readable media provide non-volatile storage of computer readable instructions embodying at least one or more game episodes. The episodes may be provided in specific game packages or subject area classifications, such as professional and amateur sports, entertainment, music, motion picture, business, print and electronic media, or politics. In such a case, a gallery or listing of game episodes may be provided for each game package. For example, a computer-readable medium may have several game episodes with celebrities from the music industry or from the motion picture industry.

In further aspects, a game episode may be implemented with a product featuring a celebrity. For example, a digital video disk or other optical media having a movie featuring a celebrity or celebrities in the movie may have one or more game episodes included therein. In such as case, a challenger can select a celebrity in the movie and play a head-to-head trivia game in a simulated environment. Further, this aspect of providing a game episode with a product featuring the celebrity could be implemented with CD ROM or other optical media, such as songs of the celebrity. These aspects provide a challenger with experiences of the celebrity in different situations and provide the celebrity other avenues of reaching their fans. It will be appreciated by those skilled in the art that other types of computer readable media that can store data that is accessible by a computer may also be used, such as magnetic cassettes, flash memory cards, read only memories (ROMs), and the like.

Selecting a Celebrity

Various approaches can be used to select a celebrity for the competition. An approach to selecting a celebrity may include a process of determining the popularity of a person. In general, a relatively high popularity can facilitate the selection of a celebrity for a game episode. In one approach, web-based search requests can be used as a proxy for determining the popularity of a person. By way of example, search results on any search engine, such as the MSN® web site, can indicate how many users are interested in finding out more about a particular person. Nevertheless, other approaches that might be used as a proxy for determining the popularity of a person may includes surveys or polling regarding name recognition of a person; the number of fan clubs or sites devoted to a person; the amount of general media coverage of a person; the magnitude of memorabilia available related to a person; the number of downloads of images of a person; or direct voting of who the public wants to play against in a game episode.

In an alternative approach to selecting a celebrity, the popularity of a media offering might be used and the persons involved in the media offering could be selected. Such media offering may include but are not limited to sports leagues and teams, television shows, motion pictures, theatrical events, concerts, books, or songs. To determine the popularity of the media offering, the magnitude of web search results requesting information about a media offering could be implemented. Alternatively, the relative magnitude of sales of the media offering could be used; name recognition of the media offering; or media ratings of the offering. Thusly, the popularity of the media offering may be used as the basis of the selecting, rather than the direct popularity of the person himself or herself. This approach can be advantageous, because some challengers may readily recognize the media offering associated with the celebrity, rather than directly recognizing the celebrity alone. One example, a popular movie may generate a lot of interest, but have no individual highly popular person associated with that movie. In this approach, an actor, director, or producer of the movie can be selected based on the popularity of the movie. In another example, a sports team which has won a major championship may be popular, but an individual player of the sports team might not be readily recognized. A professional football team that has won the Superbowl may have may name recognition, but a specific player not be highly popular.

Preprocessing for a Game Episode

Prior to the competition of a game episode, the voice and/or a video image of the celebrity may be recorded answering a number of questions for a game episode as shown in FIG. 3. In this process, a series of quiz questions may be presented with multiple answer-choices, but the celebrity does not know the correct answer-choice. This aspect can be accomplished by a human game host verbally asking the celebrity quiz questions and corresponding answer-choices during a telephone or an on-camera interview of the celebrity. If desired, other types of questions formats can be used in this process. In furtherance of the processing, the recorded voice and/or the video image of the celebrity is converted or otherwise edited into program modules for a game episode. The celebrity message of step 210 and step 226. As previously discussed, in one aspect, program modules may include audio files and/or multimedia files that are provided by the game server 40 for presentation to the challenger 15 (see FIG. 2).

Cellular Phone Environment

Figure 10:
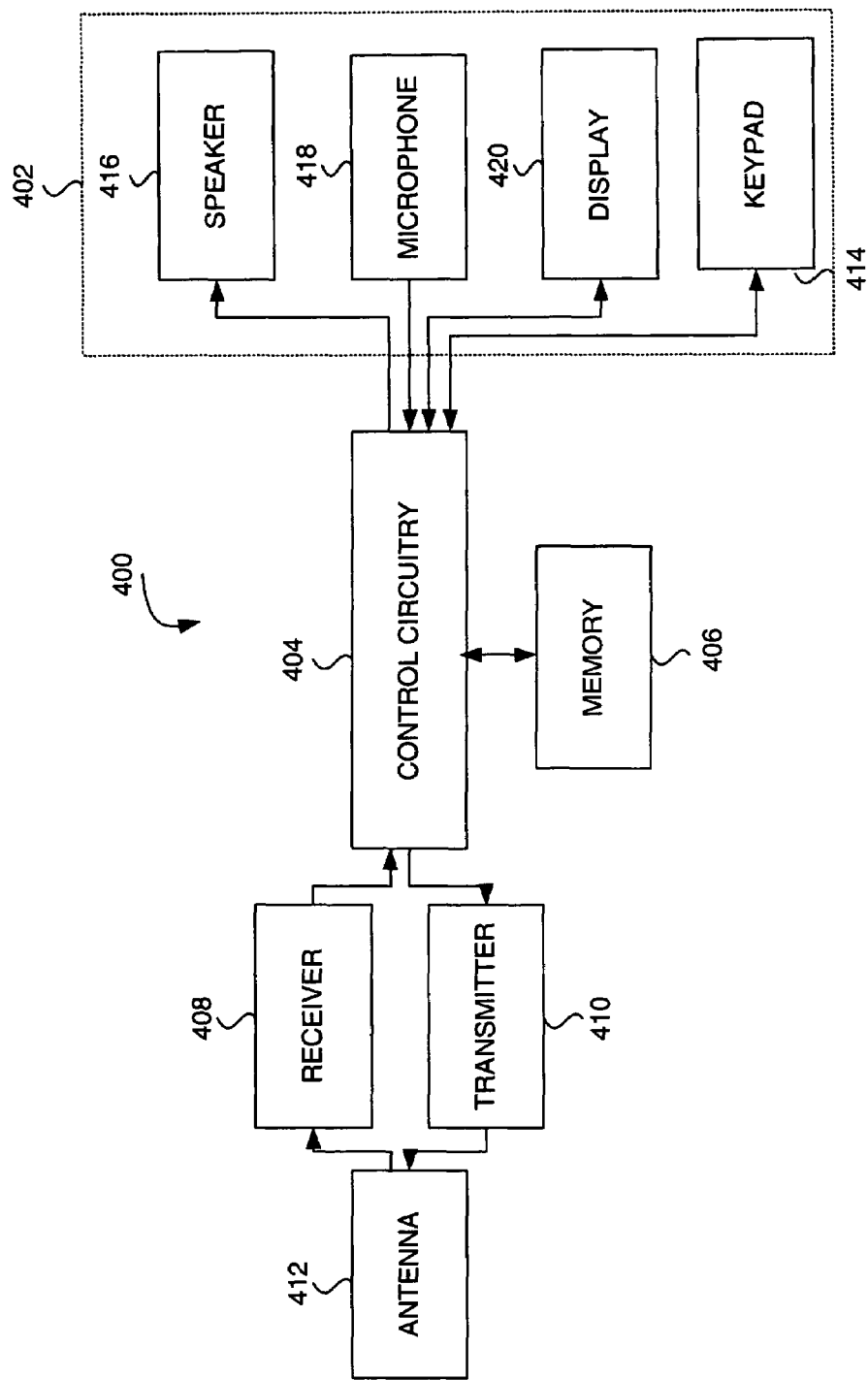
FIG. 10 is a schematic representation of a general-purpose wireless communications environment that can used to implement various aspects of the invention.

FIG. 10 illustrates a schematic diagram of an exemplary conventional wireless communications environment that can be used to implement various aspects of the present invention.

In FIG. 10, a cellular phone device 400 may include electronic components and application programs including a user interface 402, a control circuitry 404, a memory 406, a receiver 408, a transmitter 410, and an antenna 412. User interface 402 a portion of the cellular phone device 400 that provides audio and visual signals to a user. The user interface 402 is operatively connected to the control circuitry 404. The user interface 402 may optionally include a speaker device 416, a microphone device 418, a display device 420, and a keypad 414. The speaker device 416 provides audible signals to user. The microphone device 418 receives audio input from the user and converts the signals into the appropriate format for the control circuitry 404 to use the signals. The display device 420 provides visual signals to the user in the form of alphanumeric characters, colors or graphical symbols. The display device 420 may be a device used in wireless communication devices, such as a liquid crystal display. The control circuitry 404 may include a microprocessor (not shown), and digital signal processor (not shown) for use on wireless networks. Also control circuitry 404 may include microsoftware and network interface software that facilitates cellular phone 400 interfacing to a wireless communications network (not shown).

The control circuitry 404 is operatively coupled to receiver 408, transmitter 410, and memory 406. Memory 406 stores data installed or programmed by the user, including a game episode of the present invention. Memory 406 may be any programmable type in which nonvolatile storage can be electrically erased and reprogrammed. Possible alternatives include flash memory, flash ROM, RAM with battery backup. The receiver 408, transmitter 410 and antenna 412 provide the function of facilitating cellular phone 400 to connect with wireless communications network. The receiver 408 is operatively coupled to the antenna 412 for receiving a wireless communication payload, including a game episode. The transmitter 410 is also operatively coupled to the antenna 412 for sending a wireless communication payload. It should be understood that a game episode formatted for cellular phone device 400 may be downloaded to memory 404 assuming device 400 has wireless Internet access or other well-known access methods.

It is to be understood that the some or all of the aspects of the gaming process illustrated in FIG. 3 may be implemented on the device shown in FIG. 10. In one arrangement, user input to the answers-choices may be performed by entering a number on keypad 414. Alternatively, user input may be via voice response or by selecting letters on a keypad 414. The audio portion of the game episode can be presented via speaker 416. The representative environments shown in FIGS. 4-9 may be implemented for cellular phone device 400. In this manner, players have an alternative format for entertainment and business enterprises have another avenue to reach customers for advertising.

Alternatively, a wireline telephone (not shown) or the cellular phone device 400 can be configured to interface with an Interactive Voice Response System (IVR) to play an audio-driven electronic embodiment of a game episode as described with reference to aspects of FIG. 3. Accordingly, an IVR system may have a device that can recognize and/or discriminate between verbal inputs or Dual Tone Multi-Frequency (DTMF) inputs. The game episode may have prerecorded messages that have a question and a list of answer choices for the caller/challenger to play. The challenger may use a touch-tone keypad or voice inputs to enter the digit or letter indicative with the desired answer choice or choices. It should be understood that other features and aspects as described in the present application may be implemented on a wireless communications device.

Real-Time Game Show Environment

As discussed in the Game Flow section of the present application, various aspects of the invention can be implemented in a real-time game show format, such as a television show broadcast. In this aspect, a celebrity, and a challenger compete against each in a real-time on a stage, sound stage, or other venue. In one aspect, the game show may be recorded or filmed for transmission to a communications network, such as a satellite network, a broadband network, a cable TV, or the public Internet including the World Wide Web. In one aspect, a human game show host may preformed some of the steps of shown in FIG. 3. For example, in step 212, the game show host can interview of the celebrity in a live talk show format and provide the linking discussion as previously described with reference to FIG. 3. In step 214, a question can be presented to the challenger by the game show host or other method previously described. As previously explained, the question is associated with the celebrity in the competition. In step 216, the challenger may answer the question verbally or other methods, such as writing the answer etc. Also, the game show host can provide commentary during the answer.

In step 218, the game show host may request an answer from the celebrity. In this aspect, the answer is generally not preselected by the celebrity, rather the celebrity attempts to answer to question right along with the challenger. This aspect provides an additional spirited competitive game show environment. In step 220, the correct answer may be presented to both the challenger and the celebrity. In one aspect, the answer may me presented at the same time to provide an enhanced gaming experience. In step 222, the answers can be compared and in step 224 the respective scores can be updated, accordingly. As previously described, step 226 may be implemented in that the celebrity can provide a real-time celebrity message or other statements. It should be appreciated that in other aspects, the steps and other features as disclosed in the specification may be implemented during a real-time game show as well.

A Summarization of the Interactive Competition

An interaction competition provides an entertaining enjoyable environment for a player to compete against a celebrity in a head-to-head trivia game. In one aspect, the questions are associated with the celebrity rather than random general information or general trivia. In certain aspects, the competition is asymmetrical in which the celebrity can participate via prerecorded audio media, prerecorded audio-visual media and the challenger competes on a real-time basis against the celebrity. A goal of the competition is for a player to gain more points than the celebrity. Another goal of the competition is for the player to answer more questions correctly than the celebrity. In both goals, the player can win a designation of as a "true fan" of the celebrity. In further aspects, computer-readable media provide nonvolatile storage of computer readable instructions embodying at least one or more game episodes. In further aspects, a game episode may be implemented with a product featuring a celebrity. An approach to selecting a celebrity may include a process of determining the popularity of a person. In another aspect, the popularity of a media offering might be used to select a celebrity for a game episode. In other aspects of the invention, the competition can be provided in many different gaming environments.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. A computer implemented method of conducting an asymmetric interactive electronic game competition between a celebrity playing against a player, comprising the steps of:

downloading from a computer network to a device having a computer readable memory, a multiplicity of quiz questions and a plurality of electronic stored answers previously selected by the celebrity in response to the quiz questions, respectively;

electronically presenting at least one of the quiz questions to the player playing against the celebrity via the device in real-time and the quiz question having at least a correct answer and at least an incorrect answer;

receiving an answer input from the player in real-time via an electronic user interface;

retrieving from the computer readable memory, an electronic stored answer previously selected by the celebrity in response to the quiz question, interactively presenting the electronic stored answer previously selected by the celebrity to the player;

electronically updating a score for the player and a score for the celebrity by comparing a correct answer with the received answer input from the player and the stored answer previously selected by the celebrity; and repeating the quiz question presenting step, the receiving step, the retrieving step, the preselected answer presenting step, and the updating step for each of a multiplicity of quiz questions.

2. The method according to claim 1, wherein the step of electronically presenting a quiz question, further includes providing audio data to audibly present the quiz question; and wherein the step of interactively presenting an electronic stored answer by the celebrity, further includes a step of providing stored audio data of the celebrity for audibly providing the answer to the player.

3. The method according to claim 2, wherein the step of presenting a quiz question further includes a step of visually presenting the quiz question; and wherein the step of interactively presenting an electronic stored answer by the celebrity, further includes a step of providing stored video data of the celebrity for displaying the answer to the player.

4. The method according to claim 1, further including a step of providing data so as to display the answer input from the player differently than the stored answer previously selected by the celebrity.

5. The method according to claim 1, further including a steps of: providing a bantering message to the player, responsive to a determination that the answer input received from the player matches an incorrect answer and the stored answer previously selected by the celebrity matches the correct answer; providing a congratulatory message to the player, responsive to a determination that the answer input received from the player matches the correct answer and the stored answer previously selected by the celebrity matches an incorrect answer; and providing a consoling message to the player, responsive to a determination that the answer input received from the player matches an incorrect answer and the stored answer previously selected by the celebrity matches an incorrect answer.

6. The method according to claim 1, wherein the quiz questions are associated with the celebrity.

7. The method according to claim 1, further including a step of streaming a multimedia celebrity introduction having audio and video to the player via the device.

8. The method according to claim 1, further including a step of randomly selecting the multiplicity of quiz questions.

9. The method according to claim 1, further comprising executing the presenting step, the receiving step, the providing step, the updating step, and the repeating step for a plurality of players.

10. A computer-readable medium having computer-executable components, comprising:
   a game host component configured for interactively presenting prerecorded audio data including a plurality of trivia questions;
   a celebrity component configured for storing preselected celebrity answers and for presenting the stored celebrity answers responsive to the trivia questions;
   a multimedia component being in connection with a celebrity playing against a player via the celebrity component, the multimedia component configured to provide at least a movie of the celebrity;
   a user interface component configured for selecting the celebrity component so as to receive a player's real-time answers to the trivia questions; and
   a scoring component configured for tracking a score of a player based on the player answers and tracking a score of the celebrity based on the stored celebrity answers.

11. The computer-readable medium according to claim 10, wherein the celebrity component further includes stored audio data including the stored celebrity answers to the trivia questions.

12. The computer-readable medium according to claim 10, wherein the plurality of trivia questions are associated with the celebrity playing via the celebrity component.

13. The computer-readable medium according to claim 12, wherein the game host component and the celebrity component are configured to provide an electronic visual representation of the trivia questions and of the stored celebrity answers, respectively.

14. The computer-readable medium according to claim 10, wherein the celebrity component is configured to present at least one stored celebrity message responsive to the player answers.

15. The computer-readable medium according to claim 14, wherein the at least one stored celebrity message includes a bantering message.

16. The computer-readable medium according to claim 10, wherein the user interface component is configured to receive DTMF tones representing the player answers to the trivia questions.

17. A computer implemented method of conducting a real-time gaming competition between a celebrity and a non-celebrity, comprising the steps of:
   downloading from a computer network to a device having a computer readable memory, a multiplicity of questions and a plurality of answer options previously selected by the celebrity in response to the questions, respectively;
   presenting a linking discussion for at least one of the questions;
   presenting said at least one question from the computer readable memory, the question having a plurality of answer options including at least one correct answer option and at least one incorrect answer option, the question having trivia information being associated with the celebrity;
   receiving a first answer option from the non-celebrity playing against the celebrity;
   retrieving from the computer readable memory, the answer option that was previously selected by the celebrity in response to the question;
   adjusting a non-celebrity score, if the first answer option received from the non-celebrity matches the correct answer option; adjusting a celebrity score, if the answer option of the celebrity matches the correct answer option; and updating the non-celebrity score and the celebrity score for sequential questions; and
   repeating the presenting steps, the receiving steps and the adjusting step for at least three sequential questions.

18. The method according to claim 17, further including a step of providing the non-celebrity score to a rating system that includes other scores of different non-celebrities.

19. The method according to claim 17, wherein the step of retrieving the answer option of the celebrity, further includes providing data to visually display the answer option on a display device.

20. The method according to claim 17, wherein the sequential questions includes at least four sequential questions being indirectly associated with the celebrity.

21. The method according to claim 17, wherein the sequential questions are limited to questions being indirectly associated with the celebrity.

22. The method according to claim 17, wherein the step of presenting a question includes a step of displaying the question and the answer options.

23. The method according to claim 17, further comprising streaming a multimedia celebrity introduction having audio and video to the non-celebrity via the device.

24. A computer-readable medium having computer-executable components for an interactive competition with a celebrity player and a real-time player, comprising:
   a question component including a plurality of trivia questions, and the trivia questions being computer readable data for audio presentation and visual presentation on a computer device, and said trivia questions having a plurality of answer options configured for user selection;
   a celebrity component including a plurality of stored celebrity player answers to the trivia questions;
   a media component being in connection with the celebrity player and different from the interactive competition, the media component configured to provide at least a plurality of sound recordings of the celebrity,
   a user interface component being operatively connected to the question component and celebrity component; the interface component being configured for receiving a player's answers to the trivia questions and electronically selecting the celebrity player, wherein the player is playing against the celebrity; and
   a scoring component configured for tracking a score of the player based on the player answers and tracking a score of the celebrity based on the stored celebrity answers.

25. The computer-readable medium according to claim 24, in which the trivia questions are associated with the selected celebrity player.

26. The computer-readable medium according to claim 24, further including a stored celebrity bantering component having data for presentation to a non-celebrity player.

* * * * *